Figure 3:
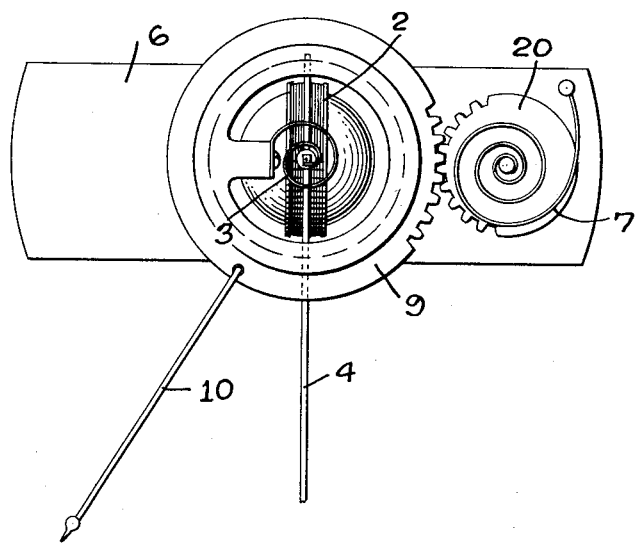

May 26, 1925.

C. H. WILSON 1,539,452

COMPENSATING MEANS FOR TEMPERATURE MEASURING INSTRUMENTS

Filed Oct. 8, 1921 2 Sheets-Sheet 2

Charles H. Wilson INVENTOR

BY

Emery, Varney, Blair & Hoquet ATTORNEYS

May 26, 1925.  1,539,452
C. H. WILSON
COMPENSATING MEANS FOR TEMPERATURE MEASURING INSTRUMENTS
Filed Oct. 8, 1921   2 Sheets-Sheet 1

Charles H. Wilson INVENTOR

BY

Emery, Varney, Blair & Hoguet ATTORNEY'S

Patented May 26, 1925.

1,539,452

UNITED STATES PATENT OFFICE.

CHARLES H. WILSON, OF MOUNT VERNON, NEW YORK, ASSIGNOR TO WILSON-MAEULEN COMPANY, INC., OF NEW YORK, N. Y., A CORPORATION OF NEW YORK.

COMPENSATING MEANS FOR TEMPERATURE-MEASURING INSTRUMENTS.

Application filed October 8, 1921. Serial No. 506,285.

*To all whom it may concern:*

Be it known that I, CHARLES H. WILSON, a citizen of the United States, and a resident of Mount Vernon, county of Westchester, State of New York, have invented an Improvement in Compensating Means for Temperature-Measuring Instruments, of which the following is a specification.

My invention relates to measuring instruments and particularly current measuring instruments adapted for use in connection with pyrometers, and aims to provide a simple, efficient and easily operated means whereby the instrument may be compensated both for variations in the temperature of the instrument itself and when used in conjunction with a pyrometer for variations in cold junction temperature.

My improved apparatus provides a means for measuring the temperature of the instrument and adjusting the indicating needle of the instrument to such temperature, the indicating needle being compensated in any suitable manner, such as by means of the bimetallic element or Briguet spiral of the prior art. An important feature of my invention consists in the use of the same temperature-responsive element for measuring the temperature of the instrument and for compensating the indicating needle.

The prior art, as for instance, in the patents to Brown, No. 1,144,688 and Zeleny, Nos. 705,186 and 705,187, discloses the principle of manually adjusting the indicator of the pyrometer instrument to the temperature of the instrument. For instance, Brown in his Patent No. 1,144,688 says:

"A thermometer should be preferably mounted on or be adjacent to the indicating or recording instrument.

"The operation of the system is as follows—The operator observes the temperature of the thermometer at the indicating or recording instrument, we will assume this temperature to be 75° F. He then adjusts the pointer by the zero adjusting device on the instrument to 75° on the scale."

This method of the prior art involves the determination of the temperature of the instrument by means of a temperature-measuring device which is unrelated to the operating portions of the instrument and therefore involves considerable error due to differences in the effect of variations in temperature upon the temperature-measuring device and the bimetallic compensating element and due to errors in observation. My improved device aims to make the determination of the extent of temperature compensation required entirely automatic and to reduce the function of the operator to the mere manual operation of setting the indicating pointer of the instrument to coincide with the temperature-measuring pointer.

Furthermore, in my improved device, the determination of temperature compensation required is made by the same temperature-sensitive element as is used for the compensation of the indicating devices, without the use of a separate temperature-indicating device and thus avoiding the errors incident thereto, as pointed out above, and greatly simplifying and reducing the cost of manufacture.

Figure 1:
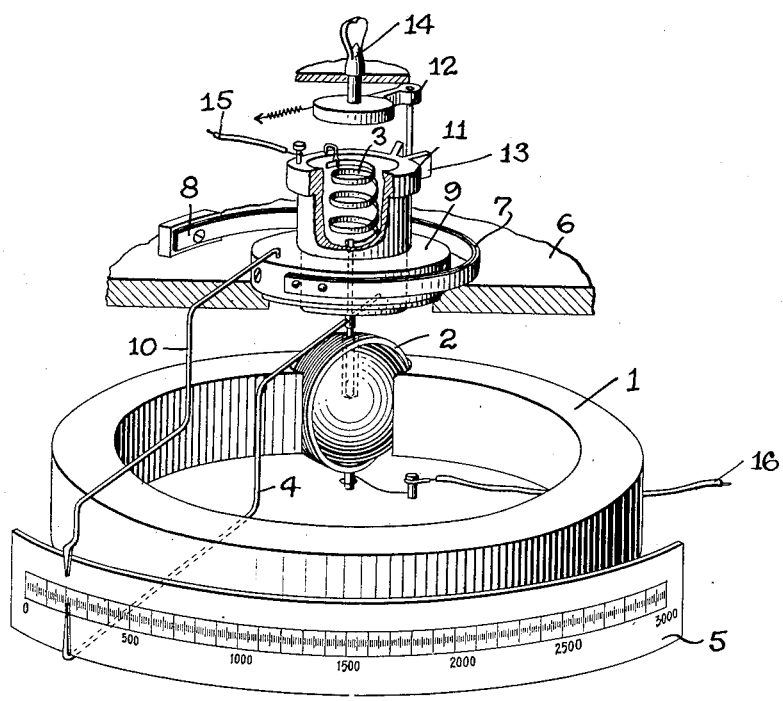
Figure 2:
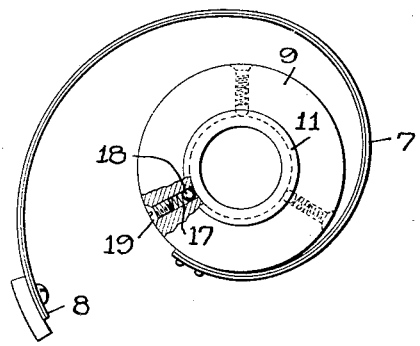

In the drawings, I have shown:

In Fig. 1, a front view, partly in section, of my improved device;

In Fig. 2, a detailed view of the compensating mechanism; and

Figure 4:
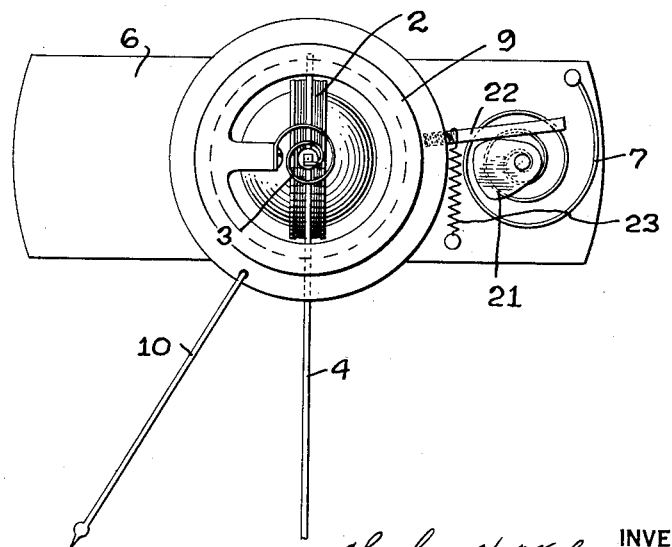

In Figs. 3 and 4, detailed views of modifications of the compensating mechanism.

The sensitive portions of the instrument may be in any convenient form, as for instance, the magnet 1, coil 2, supported in any convenient manner and controlled by the spiral 3, and carrying the indicating pointer 4, cooperating with the scale 5, or if desired, with a separate scale used for measuring the temperature of the instrument.

Mounted upon a fixed portion of the instrument 6 is a bimetallic compensating spiral 7, one end of which is fixed to the part 6, as at 8, the other end of which is attached to a movable annulus 9, which carries the temperature-indicating pointer 10, the arrangement being such that changes in temperature will affect the bimetallic element 7, to cause rotation of the annulus 9 and movement of the pointer 10 upon the scale 5, thus measuring the temperature of the instrument. Frictionally mounted in the annulus 9 is a bushing 11 from which the spiral 3 is hung. Said bushing may be rotated to set the indicating pointer 4, by any suitable means, such as the rod 12, cooperating with the ears 13 on the bushing 11 and manually operated by the adjusting knob 14, the separation of the ears 13 being sufficient to permit free rotation of the pointer 4 without interference with the rod 12. The rod 12 may be centered between the ears when released, by means of a spring or other suitable device. Current is led to the device by means of suitable leads 15 and 16.

In Fig. 2, there is shown the means for securing friction between the annulus 9 and the bushing 11 which may comprise the springs 17 bearing against balls 18 and held in place by means of the screws 19. The friction is so adjusted that the bushing 11 will not fail to turn with the annulus 9, but at the same time will not offer too much friction to prevent adjustment of the bushing with respect to the annulus.

In the modification shown in Fig. 3, the arrangement is such that the sensitivity of the instrument is increased by the reduction in mechanical friction. It has been found that the bimetallic spiral 7 has a tendency to give side thrusts on the bearings of the rotating member and the arrangement of Fig. 3 is designed to obviate this difficulty. In said arrangement, the bimetallic spiral is attached to an intermediate gear member 20, which is in turn geared to the annular member 9, which carries the control spring 3 of the instrument. This arrangement permits the bearings of the intermediate member 20 to be made of very small diameter and of low mechanical friction and enables the spiral to be of greater length, its movement being reduced through the difference in diameter of the intermediate member 20 and the annular member 9.

In the arrangement of Fig. 4, provision is made for the use of a bimetallic spiral which does not under the influence of heat, move in a straight line function, or for the use of a thermocouple in which the temperature relation of temperature change to voltage change is not a straight line function, as for instance, a platinum-rhodium thermocouple, in which the relation is substantially parabolic. By "move in a straight line function" I mean, as known in the art to which this invention appertains, that equal increments of temperature will produce equal increments of motion. In this case the bimetallic spiral 7 serves to rotate a cam 21 of suitable configuration according to the character of the bimetallic spiral or thermocouple used, which may engage a rod or other projection 22 upon the annular member 9, the rod being held in contact with the cam 21 by means of a spring 23, or other suitable means In the operation of my device, the temperature of the zone in which both instrument and the cold junction are located is measured at all times and independently of the electric condition of the instrument, by the pointer 10 under the influence of the bimetallic element 7. The adjusting knob 14 is turned, the meter being on open circuit, until the indicating pointer 4 is adjusted to the temperature of the instrument as indicated by the position of the temperature-indicating pointer 10, whether upon the same or a separate scale. Thereafter variations in cold junction temperature are compensated for by means of the bimetallic spiral 7 acting upon the indicating pointer 4 and further adjustment of the device is unnecessary. Thus, in the operation of my improved device, no setting of the instrument is made to a zero position which is independent of the temperature-compensating element 7. To make the operation clear, reference may be had to the Frey and Wagner Patent No. 1,363,964, in which a normal zero is established upon a fixed scale, this normal zero being the position to which the indicating pointer of the instrument should return upon open circuit without reference to the bimetallic compensation, since the construction of the instrument of said patent is such that the scale and not the pointer is compensated; the calibrated scale which has no reference to the normal zero position being thermostatically compensated for variations in cold junction temperature. On the other hand, the adjustment of the instrument of my invention, as pointed out above, is to measure, by means of the bimetallic element, at that time operating merely as a thermometer, the temperature of the instrument and then to adjust the position of the electrically-responsive pointer to such temperature by moving said pointer with respect to the bimetallic element a distance sufficient to correct any variations in the control spring. It will be seen that I have thus provided means for using the same bimetallic sensitive element both to determine the temperature of the instrument and to compensate for variations in cold junction temperature and have provided a convenient means for manually adjusting the electrically-responsive pointer to the degree of compensation indicated to be necessary by the temperature of the instrument.

It will be understood that I do not intend to limit myself to the particular modifications shown and described, as obviously many changes may be made therein without departing from the spirit of my invention.

What I claim is:

1. In a pyrometric indicating instrument associated with a thermocouple having a cold junction, a common thermo-sensitive element adapted both to measure the temperature of the instrument and to compensate the indicating devices thereof for cold junction temperature variations, means supporting said common thermo-sensitive element, and means connected to said supporting means and adjustable relative thereto for supporting one of said indicating devices.

2. In a thermoelectric pyrometer for use with a thermocouple having its cold end extended into the same temperature zone as the meter, a meter of the deflecting type having a pointer and scale, a bimetallic thermosensitive element arranged to compensate the galvanometric indications of the pointer to correct for fluctuations of cold junction temperature of the thermocouple, and a pointer, other than the galvanometric pointer, attached to said bimetallic element so as to form with said bimetallic element a thermometer adapted to measure the temperature of the temperature zone of the meter.

3. In a pyrometric indicating instrument, a movable element responsive to variations in electric current, an indicating device actuated thereby, a thermostatic element adapted both to measure the temperature of the instrument and to compensate for variations in cold junction temperature, indicating means connected with said thermostatic element, and means connected with said thermostatic element and adjustable relatively thereto for moving the indicating device to a predetermined relation with respect to the temperature indication.

4. In an electric measuring instrument, an element responsive to variations in temperature, means responsive to variations in electric current, a member controlling said electric current-responsive means and connected with the temperature-responsive element and manually operable means for moving said member from which the electric current-responsive element is controlled, with respect to the temperature-responsive element.

5. In a measuring instrument, an annular member, a thermostatic element connected to said member whereby said member is made responsive to variations in temperature, a bushing mounted in said annular member, an electric current-responsive device controlled from said bushing and manually operable means for moving said bushing with respect to said annular member.

6. In a measuring instrument, a member movable in response to variations in temperature whereby the temperature of the instrument is indicated, an electric current-responsive member, a control spring therefor having one fixed end, means interposed between the current-responsive member and the temperature responsive member for varying the position of said control spring in response to movement of the fixed end of the temperature-responsive member, and manually operable means for moving the control spring with respect to the temperature-responsive member to initially compensate the instrument to the extent required by the indicated temperature.

7. A pyrometric measuring instrument adapted to measure variations in temperature by means of a thermocouple of which the relation of temperature change to voltage change is not a straight line function comprising a temperature-responsive member, an electric current-responsive member and coupling means interposed therebetween adapted to move the electric current-responsive member in a direct ratio to the function of the thermocouple.

8. A pyrometric measuring instrument adapted to measure variations in temperature by means of a thermocouple of which the relation of temperature change to voltage change is not a straight line function comprising a temperature-responsive member, an electric current-responsive member, coupling means interposed therebetween adapted to move the electric current-responsive member in a direct ratio to the function of the thermocouple and manually operable means to adjust the electric current-responsive member to the temperature of the cold junction of the thermocouple on open circuit.

In testimony whereof, I have signed my name to this specification this 5th day of October, 1921.

CHAS. H. WILSON.